Dec. 1, 1970  O. R. JACKSON  3,543,433

WORM TRAP

Filed March 19, 1969  4 Sheets-Sheet 1

INVENTOR.
OSCAR R. JACKSON
BY
Rogers, Bereskin, & Parr

Dec. 1, 1970     O. R. JACKSON     3,543,433

WORM TRAP

Filed March 19, 1969     4 Sheets-Sheet 3

INVENTOR.
OSCAR R. JACKSON

BY
Rogers, Bereskin, & Parr

Dec. 1, 1970    O. R. JACKSON    3,543,433
WORM TRAP

Filed March 19, 1969    4 Sheets-Sheet 4

INVENTOR.
OSCAR R. JACKSON

BY
Rogers, Bereskin, & Parr

United States Patent Office 3,543,433
Patented Dec. 1, 1970

3,543,433
WORM TRAP
Oscar R. Jackson, 910 Bridge St., Niagara Falls,
Ontario, Canada
Filed Mar. 19, 1969, Ser. No. 808,440
Int. Cl. A01m 23/24
U.S. Cl. 43—78
17 Claims

ABSTRACT OF THE DISCLOSURE

A worm trap having a planar grid structure, typically formed by a wire mesh, adapted to lie on the ground containing worms to be caught, so that worms leaving their holes will crawl over the grid structure. Guide arms extend upwardly from the grid structure through a backing structure formed by a sheet of perforated metal covered by sponge rubber. In the trap's set condition, the grid and backing structures are spaced apart. When the trap is sprung, heavy springs acting on the guide arms snap the grid and backing structures together, pinning between them worms that have crawled over the grid structure.

---

This invention relates to a trap for collecting worms.

In the past, worms have normally been collected manually by worm pickers. Because of the difficulties in catching worms, worm picking in the past has been an inefficient and difficult procedure. One problem has been that when the picker approaches closely to worms on the surface of the ground, the worms are able to detect his presence. Although the worms may be thickly clustered in a particular area, by the time the picker has caught one or two worms the remainder have re-entered the ground and disappeared. Therefore, collecting worms has required considerable labour, resulting in high costs.

The present invention provides a mechanical device intended to collect or trap worms in a more efficient manner, resulting in reduced overall costs. Basically, the invention provides a generally planar grid structure formed by a plurality of thin members arranged to define a plurality of openings therebetween. The grid structure is adapted to lie on the ground containing the worms to be caught, so that worms will leave their holes and crawl over the members forming the grid structure. Backing means are provided for the grid structure, and means are provided to move the grid structure and backing means from an open position in which they are spaced apart to a closed position in which they are closely adjacent each other, so that worms which have crawled over the grid structure will be trapped between it and the backing means.

The worms may then be collected by placing a tray under the device, opening it, and shaking the device to free the worms and deposit them in the tray.

Further objects and advantages of the invention will appear from the following disclosure, taken together with the accompanying drawings, in which.

Figure 1A:
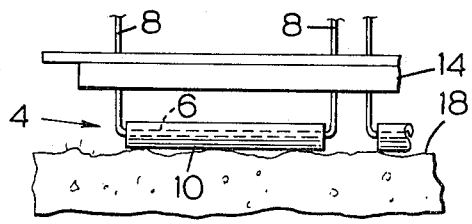
FIGS. 1A and 1B illustrate the relation of the worm holding elements of the FIG. 1 trap when the trap is open and closed respectively.
Figure 1B:
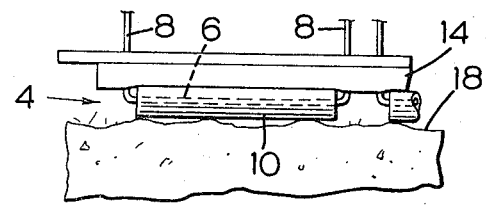
Figure 1:
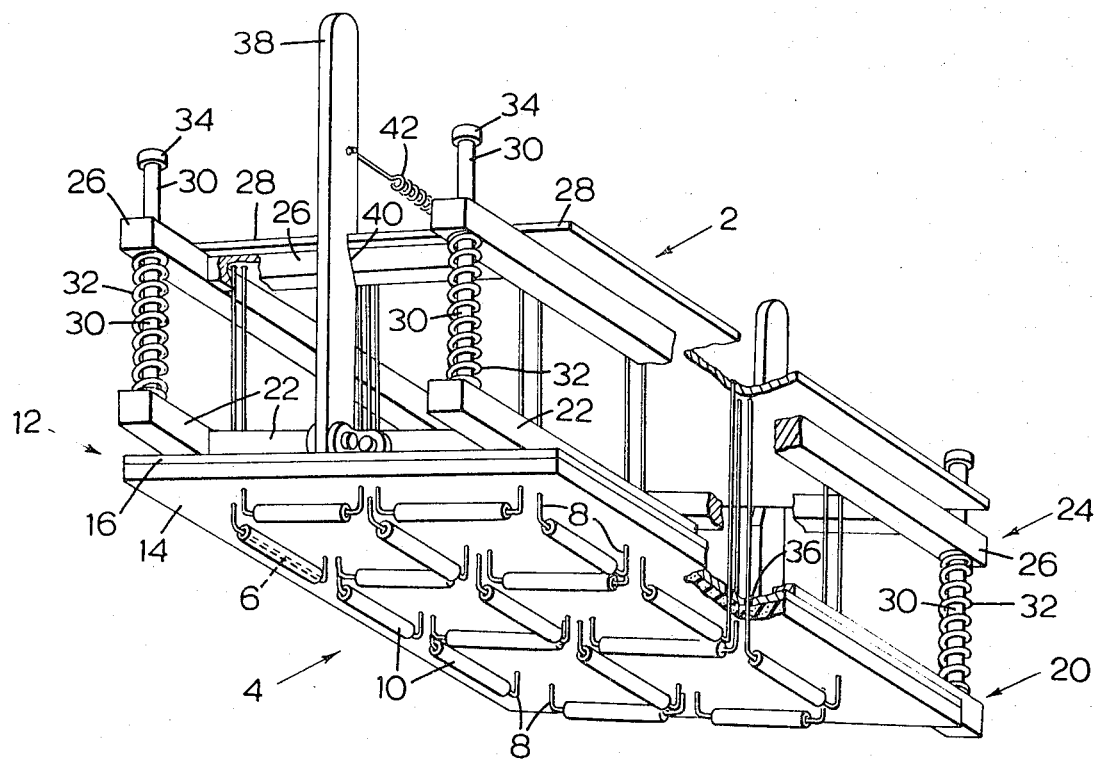
FIG. 1 is a schematic view of a simple embodiment of the device, looking up from below the device.

Reference is first made to FIG. 1, which illustrates a simple worm trap generally indicated at 2. The worm trap comprises a grid structure 4 formed from a plurality of horizontally oriented wire members 6. Each horizontal wire member 6 has, at each end, a pair of vertical guide arms 8 extending upwardly from the grid structure for a purpose to be described. The wire members 6 are preferably covered by loose fitting flexible rubber tubes 10 and are arranged to define a series of squares or rectangles, the sides of which may typically range between 2 and 8 inches in length. The grid structure 4 is adapted to be placed on the ground containing the worms to be caught, so that the worms will crawl over the rubber tubes 10.

The trap also includes a backing structure 12, which the grid structure 4 may be pressed against or moved away from as desired, as will be explained. The backing structure 12 consists of a backing sheet 14 of resilient material (typically sponge rubber), fastened to a sheet 16 of perforated metal.

When the trap 2 is in its open condition, the grid structure 4 is separated from the backing sheet 14, as illustrated diagrammatically in FIG. 1A. It is at this time that worms crawling out of the ground 18 tend to drape themselves over the rubber tubes 10. When the trap is sprung, the grid structure 4 and backing sheet 14 are snapped together by means to be described, as diagrammatically shown in FIG. 1B. This pins worms which are draped over the rubber tubes 10 between the rubber tubes and the backing sheet 14.

The mechanism for opening and closing the trap is as follows. The sponge rubber backing sheet 14 and the perforated metal sheet 16 are fixed to a lower frame 20 formed from lower frame bars 22. A separate upper frame 24 is provided, formed by upper frame bars 26 with a sheet of perforated metal 28 connected thereto. The upper frame 24 is mounted for movement upwardly away from and downwardly towards the lower frame 20 by guide columns 30 fixed to the lower frame bars 22 and extending upwardly through apertures in the upper frame bars. Heavy coil springs 32 encircling the columns 30 strongly bias the upper and lower frames apart, and caps or nuts 34 on the columns 30 limit the extent of upward movement of the upper frame.

The grid structure 4 is fastened to the perforated metal sheet 28 of the upper frame by the guide arms 8 at each end of the wire members 6. These guide arms extend upwardly through close fitting holes in the sponge rubber sheet 14, through larger holes 36 in the lower perforated metal sheet 16, and then upwardly to the top frame perforated metal sheet 28. The guide arms 8 may be fastened to the perforated metal sheet 28 by any suitable means, such as wire clips or welding.

Two levers 38 are provided, one at each end of the trap. Each lever 38 is pivotally connected to one of the bottom frame bars 22 and is notched at 40 to engage the opposing upper frame bar 22. Springs 42 bias the levers toward each other so that their notches will tend to engage the upper frame bars.

In operation, the trap is set by forcing the upper and lower frames 20, 24 together until the notches 40 in the levers 38 snap over the upper frame bars 22 to retain the upper and lower frames in their pulled together condition. In this condition, the grid structure 4 is spaced from the sponge rubber backing sheet 14 (as shown in FIG. 1A) so that worms can crawl over the rubber tubes 10. After the trap has been positioned long enough to permit worms to emerge and position themselves on the trap, the picker approaches and pushes the levers 38 apart, allowing the powerful coil springs 32 to snap the upper and lower frames apart, thus snapping the grid structure 4 against the sponge rubber sheet 14 and trapping worms therebetween. A tray is then placed under the device and the worms are removed by opening the trap and shaking it.

The wire members 6 may be spaced in any convenient configuration, e.g. square, rectangular, triangular, simple parallel lines, circular, etc. However, square or rectangular patterns are the simplest and best, in practice. In such patterns, if the wire members 6 are too far apart, some worms may emerge and not lie over the rubber tubes 10, while if the wire members 6 are spaced too closely together, the effect may be to keep the worms in the ground. The most suitable configuration is a series of squares of sides between two and four inches in length.

The rubber tubes 10 and sponge rubber 14 are provided so that the force exerted by the coil springs 32 will not cut the worms in half. The springs 32 are powerful because it is important that the device be quick acting and have firm clamping action, so that the worms cannot escape. However, the rubber tubes 10 can be omitted, particularly if the wire members 6 are enlarged slightly and flattened. In fact, under certain conditions the sponge rubber sheet 14 can be omitted, if the caps 34 are set so that in the trap's closed condition, the wire members 6 are spaced by a very small distance, e.g. 1/16 of an inch, from the metal sheet 16, to reduce damage to the worms. However, a resilient backing sheet such as sheet 14 is much preferred.

For best results the trap should either be painted or, if unpainted, should be exposed to wet soil or natural filth to create rust on the metal. Fresh, unrusted, bare metal tends to repel the worms. If desired, the trap can include a hose and sprinkler system which will ensure that it and the ground around it are moist, which will further encourage the worms.

The trap illustrated in FIG. 1 is most suitable for use on flat ground. If the ground contains undulations, then the embodiment of FIGS. 2 to 4 (in which primed reference numerals indicate parts corresponding to those of FIG. 1) is more suitable.

Figure 2:
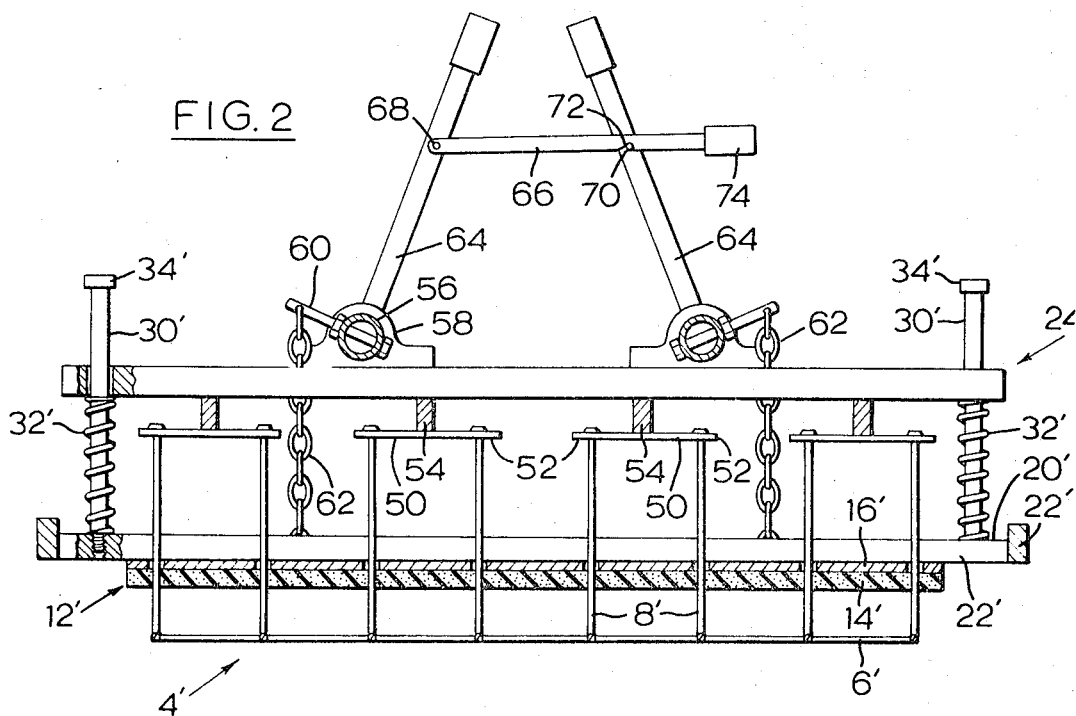
FIG. 2 is a transverse cross-section of a second embodiment of the device, illustrating means for moving the parts relative to each other.
Figure 4:
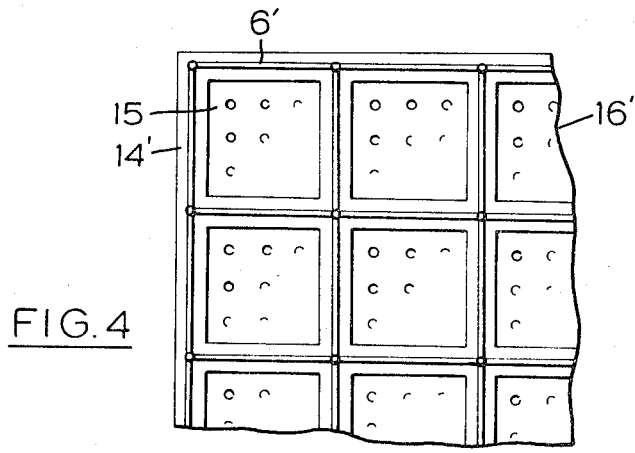
FIG. 4 is a view looking up at a mesh and pad used with the FIGS. 2 and 3 embodiments.
Figure 3:
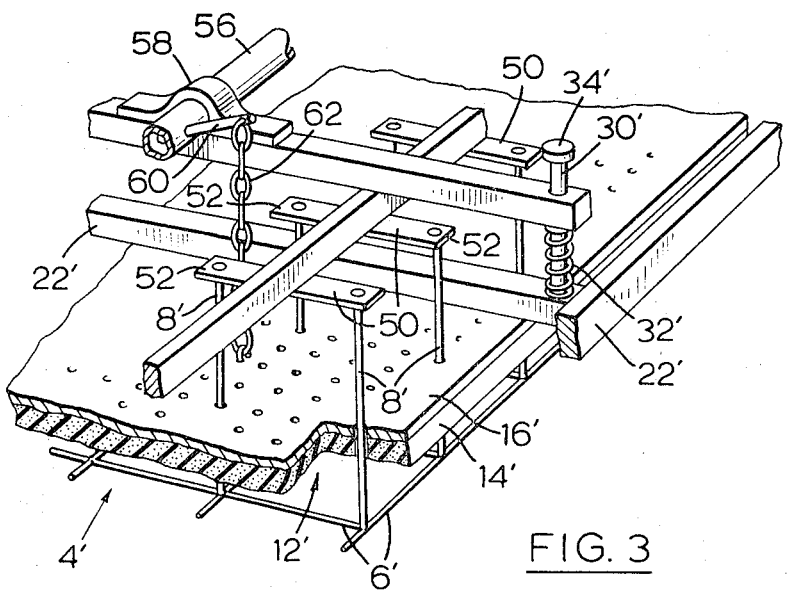
FIG. 3 is a perspective view from above, of a portion of the device of FIG. 2.

In the FIGS. 2 to 4 embodiment, the grid structure 4' is formed from a wire mesh 6', rather than from a series of individual wires each having vertically extending guide arms as in the FIG. 1 embodiment. The wire mesh 6' is connected to a series of heavier vertical guide arms 8', which pass through a lower backing assembly 12' similar to assembly 12 of FIG. 1.

The backing assembly 12' differs, however, in one respect from assembly 12 of FIG. 1, in that (see FIG. 4) the sponge rubber backing sheet 14' of assembly 12' contains a number of square openings 15 corresponding to the openings in the wire mesh. This saves weight and material while at the same time retaining a backing surface against which the wire may be snapped, and it also provides a more direct path for water to reach the ground from a sprinkler positioned above the backing assembly. Again, the guide arms 8' preferably are a fairly snug sliding fit in spong sheet 14' and have a loose sliding fit in metal sheet 16'.

The backing assembly 12' is connected to a lower frame 20' similar to frame 20 of FIG. 1, lower frame 20' being spaced apart from an upper frame 24' also similar to that of FIG. 1 by the usual vertical guide columns 30' and coil springs 32'.

The guide rods 8' from the grid structure 4', instead of being connected rigidly to the upper frame as in the FIG. 1 embodiment, are connected to a series of leaf springs 50. Each leaf spring has a pair of free ends 52, the guide arms 8' passing through such free ends and being secured thereto by any desired means, such as welding. The leaf springs 50 are fastened at their centres to longitudinal frame bars 54 forming part of the upper frame 24'.

Means are provided to enable the picker to force the upper and lower frames together against the pressure of the coil springs 32', in order to set the trap. These means comprise a pair of longitudinal pipes 56 mounted in bearings 58 fastened to the upper frame. Each pipe 56 carries at its end a pair of moment arms 60 connected by hooks to apair of chains 62 extending downwardly to the lower frame 20'. A pair of lever handles 64 are fixed to the pipe 56 at one end of the trap and may be rotated towards each other to the position shown in FIG. 2, to pull the upper and lower frames together to set the trap. A locking bar 66 is pivoted at 68 to one of the handles 64 and contains a notch 70 which engages a pin 72 on the other handle to hold the handles together to keep the trap set. To spring the trap, the free end 74 of the locking bar 66 is flipped upwardly, disengaging the lever handles 64 and permitting the coil springs 32' to force the upper and lower frames apart, snapping the grid structure 4' against the resilient sponge rubber sheet 14' and trapping any worms located on the grid structure.

This embodiment may have any convenient number of longitudinal frame bars 54 and leaf springs 50 and may be made up in any corresponding size. The leaf springs 50 will allow the guide arms 8' to move upwardly and downwardly by varying amounts when the trap is set, to take up small fluctuations in the level of the ground. If required, rubber tubes, such as tubes 10 of FIG. 1, may be placed on the members of the mesh before it is welded together. As with the other embodiments of the device, it is essential that this embodiment be either painted, or have been exposed to a film of damp soil or filth to create some rust on the metal and to coat the metal.

Figure 5:
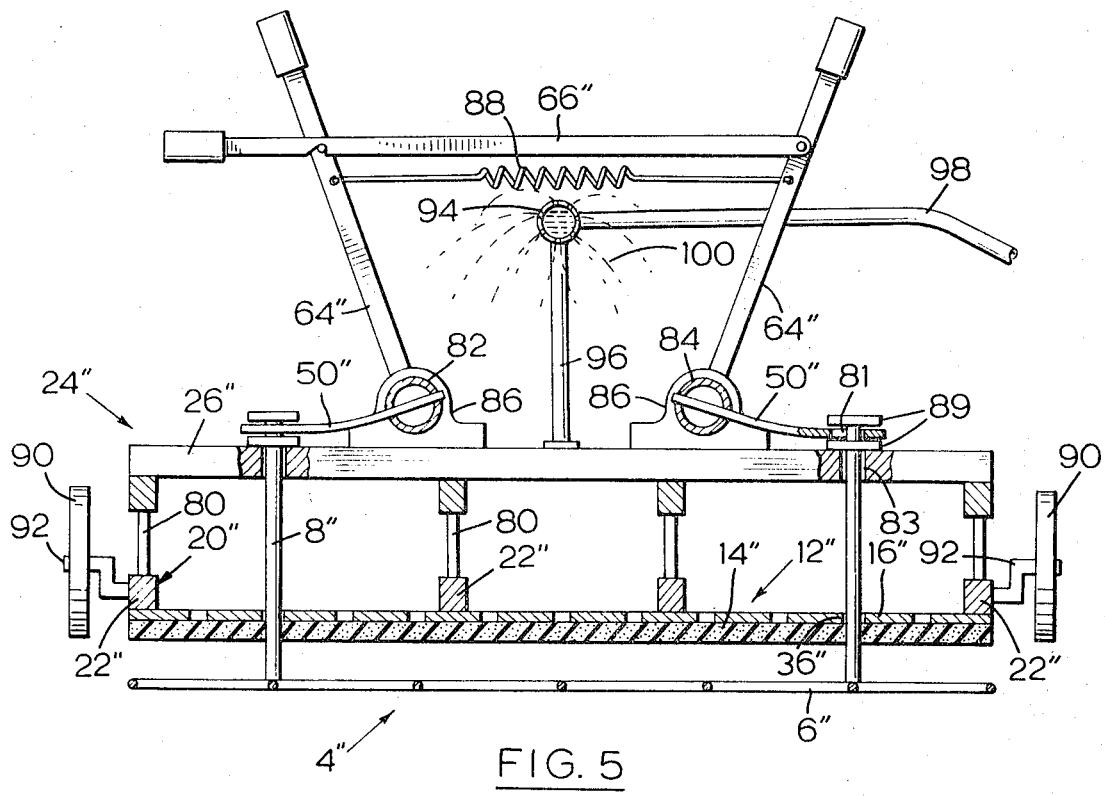
FIG. 5 is a view similar to that of FIG. 2 illustrating a third embodiment of the device.

A third embodiment of the trap is illustrated in FIG. 5, in which double primed reference numerals indicate parts corresponding to those of FIGS. 1 to 4.

The FIG. 5 embodiment is similar to that of FIGS. 2 to 4 except that the upper and lower frames 20'', 24'' are connected rigidly together by struts 80, the cross bars of the lower frame 20'' being removed since their reinforcing effect is no longer needed. Relative movement between the grid structure 4'' and the backing sheet 14'' is achieved by again connecting the rigid guide arms 8'' to leaf springs 50'' but the leaf springs are connected directly to rotatable pipes 82, 84 mounted in bearings 86 on the upper frame 24''. Each leaf spring 50'' includes a slot 81 which receives a guide arm 8'' between a pair of locating collars 89 and each transverse member of the members 26'' includes two apertures 83 for loosely restraining the guide arms 8'' to move in a generally linear path.

The rotatable pipes 82, 84 may be rotated counterclockwise and clockwise respectively by means of lever handles 64'', to force the leaf springs 50'' downwardly. This sets the trap by forcing the grid structure 4'' away from the backing sheet 14''. A heavy coil spring 88 biases the lever handles 64'' towards each other, but a locking bar 66'' holds the lever handles in their separated position. When the locking bar 66'' is slipped upwardly, the coil spring 82 pulls the lever handles 64'' towards each other, rotating the pipes 82, 84 clockwise and counterclockwise respectively, thus lifting the free ends of the leaf springs 50 and snapping the wire mesh 6'' against the backing sheet 14'' to trap worms.

When the grid structure 4'' is in place on the ground, it will tend to bend if the ground is irregular. The apertures 83 and 36'' in the upper frame 24'' and lower frame 20'' respectively are loose-fitting about the guide arms 8'' thus allowing the guide arms 8'' to move towards each other. This movement ensures that the grid structure is free to bend over small irregularities.

This embodiment may include a pair of wheels 90 mounted on a set of cranked axles 92 extending from the lower frame bars. The axles 92 are pivoted in the frame bars 22'' so that the wheels 90 can be swung away from the ground when the device is in use (as shown in FIG. 5) and can be swung to contact the ground when it is desired to empty the trap or wheel it from one site to another. Conventional stops (not shown) are provided to hold the axles 92 in either their up or down position. The size of the wheels and axles is preferably such that when the wheels are down, the bottom of the grid structure 4″ is about six inches above the ground, so that the ends of the trapped worms will be clear of the ground. A tray may then conveniently be slid beneath the trap to empty it.

The return spring 88 may be replaced by other means biasing the trap to a closed condition. For example, a coil spring may be incorporated about each pipe 82, 84, having one end attached to the pipe and the other end to the upper frame 24″. The springs will be pre-swisted to bias the pipes 82, 84 to a position in which the leaf springs 50″ are in their raised condition. Alternatively, a torsion bar may be placed inside each of the pipes 82, 84, having one end fixed to the upper frame 24″ and the other end fixed to any convenient part of the pipes.

As with other embodiments of the device, it may be desired to use a sprinkler to ensure the correct humidity conditions for catching worms. A simple tubular sprinkler 94 may be mounted on a bracket 96 and fed from a hose 98. A resulting fine spray 100 falls over the device, filtering through the perforated mesh 16″ and through the sponge rubber sheet 14″, onto the grid structure 4″ and the ground. This arrangement can be used with all embodiments of the device.

Figure 6:
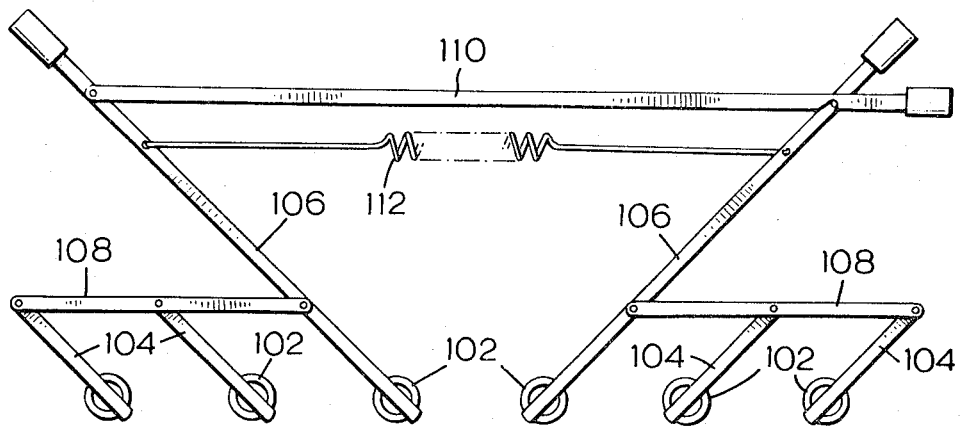
FIG. 6 is a schematic view showing a system of levers for use with a device of the type shown in FIG. 5.

The size of the embodiment illustrated in FIG. 5 can be increased by use of a system of tubes and handles such as that shown in FIG. 6. In this arrangement six rotatable pipes 102 are provided, divided into two groups of three pipes each. Each pipe will carry a series of leaf springs (not shown) such as springs 50″ of FIG. 5, connected through guide arms to a grid structure for trapping worms. The two outer pipes of each group carry short lever handles 104, and the inner pipe of each group carries a longer lever handle 106. The lever handles of each group are pivotally connected together by linkbars 108, so that movement of the two large lever handles 106 will turn all of the pipes. A locking bar 110 and spring 112 can be provided similar to locking bar 66″ and spring 88 of the FIG. 5 embodiment.

Although spring biasing means have been shown to set the trap, it is envisaged that other means may be used. For example, worm picking is usually conducted on relatively flat ground such as golf courses, where trucks can easily move about. If trucks are available, then solenoids, or hydraulic or pneumatic cylinders or accumulators, may conveniently be used or energized to spring the trap. Under such conditions, instead of means biasing the grid structure and backing sheets towards each other, there may simply be arrangement for retaining them in set or open condition, and fast acting electric, hydraulic or pneumatic means for releasing any retaining means if retaining means were needed and then for moving the grid structure and backing sheet towards each other.

Figure 7:
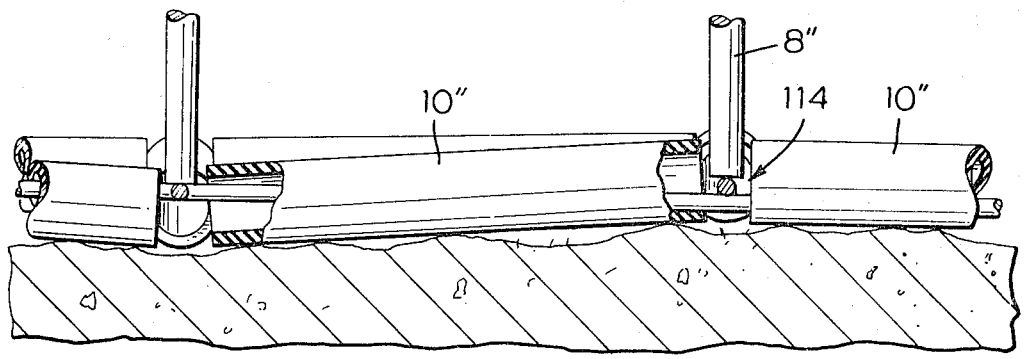
FIG. 7 is a transverse cross-section of an alternative wire mesh assembly that may be used for the device.

The FIG. 7 embodiment shows a modification of the FIG. 5 arrangement in which rubber tubes 50″ are provided on the wires 6″ of the mesh. The tubes 50″ are very loose fitting on the wire mesh, to assist in taking up irregularities in the ground contour and thus prevent worms from crawling under the mesh. FIG. 7 also illustrates an alternative method of manufacture of the mesh, in which an overlap joint 114 is formed by welding the transverse and longitudinal members of the mesh in overlapping relation. The guide arm 8″ is then welded to the uppermost part of the resulting mesh. Mesh with overlapping joints of this type is commercially available in sizes suitable for use in this device. However, the ready made mesh would require the rubber tubes 50″ to be placed on the parts of the mesh after the mesh is finished, necessitating splitting of the tubes. Consequently, it is preferable to place the tubes on the mesh as it is being made, if tubes are to be used.

Typically, two people will operate a number of traps of the types described, setting each trap, leaving it for ten or fifteen minutes to collect worms, and then returning to spring the trap and collect the worms from it. The traps can be made in very large sizes, covering 30 or more square feet, and can be transported by truck or wheeled about.

What I claim as my invention is:

1. A device for catching worms comprising:
   (a) a generally planar grid structure formed by a plurality of relatively thin members arranged to define a plurality of openings therebetween, said grid structure being adapted to lie on the ground containing the worms to be caught,
   (b) backing means having a backing surface overlying said members of said grid structure,
   (c) means supporting said grid structure and said backing means for relative movement between an open position in which said grid structure and said backing means are spaced apart so that worms may crawl over said members when said grid structure is resting on the ground, and a closed position in which said grid structure is adjacent said backing means to pin worms therebetween,
   (d) and actuating means for moving said grid structure and said backing means apart relative to each other to said open position to permit worms to crawl over said members, and for moving said grid structure and said backing means rapidly together to said closed position to trap worms therebetween.

2. A trap according to claim 1 wherein said actuating means includes means for urging said grid structure and said backing means firmly together against each other, and said backing means includes a layer of resilient material to cushion said worms.

3. A trap according to claim 2 wherein said means (c) includes a plurality of guide arms connected to said grid structure and extending vertically through said backing means.

4. A trap according to claim 2 wherein said grid is flexible to accommodate unevenness in the contour of the ground on which it is placed.

5. A trap according to claim 2 wherein said thin members are a series of wires arranged to define a plurality of square or rectangular openings.

6. A trap according to claim 2 wherein said actuating means comprises spring means biasing said grid structure and said backing means to their closed position, said trap further including retaining means for holding said grid structure and said backing means in said open position against the pressure of said spring means, said retaining means being releasable to permit said spring means to snap said grid structure and said backing means to said closed position.

7. Apparatus according to claim 3 wherein said means (c) comprises
   (1) a lower frame, said backing means being mounted on said lower frame,
   (2) an upper frame, and means mounting said upper frame for movement downwardly towards and upwardly away from said lower frame,
   (3) and means connecting said guide arms to said upper frame.

8. A trap according to claim 7 wherein said means connecting said guide arms to said upper frame comprise a plurality of spaced leaf springs connected between said upper frame and said guide arms, said leaf springs permitting said guide arms to move by varying vertical amounts when said trap is set to permit said grid structure to accommodate undulations in the ground on which it is placed.

9. A trap according to claim 7 including spring means biasing said upper and lower frames apart, and retaining means for holding said upper and lower frames together against the pressure of said spring means, said retaining means being releasable to permit said spring means to snap said upper and lower frames apart to snap said grid structure and said backing means together to their closed condition.

10. A trap according to claim 3 wherein said means (c) comprises
   (1) a frame, said backing means being mounted on the bottom of said frame,
   (2) a plurality of leaf springs distributed over said frame and oriented in a substantially horizontal plane, each leaf spring having a free end, and means connecting said leaf springs to said frame for movement of said free ends upwardly and downwardly,
   (3) and means connecting said guide arms to said free ends of said leaf springs.

11. A trap according to claim 10 wherein said means connecting said leaf springs to said frame for movement of the free ends of said leaf springs upwardly and downwardly comprises a pipe, bearing means mounting said pipe on said frame for rotation in said bearings, said leaf springs being connected to said pipe for rotation therewith.

12. A trap according to claim 11 including bias means associated with said pipe to bias said pipe to a position in which the free ends of said leaf springs are raised to press said grid structure against said backing means.

13. A trap according to claim 3 wherein said thin members are formed by a plurality of wires, each of said wires being covered by a loosely fitted rubber tube.

14. A trap according to claim 13 wherein said guide arms are formed by upwardly turned portions of said wires.

15. A trap according to claim 2 wherein said grid structure is formed from wire mesh made of a network of wires meeting at welded joints, each of the wires forming said mesh being covered by loosely fitted rubber tubes between said joints.

16. A trap according to claim 2 wherein said means (c) includes four wheels and axles, said wheels being positioned so that when said trap is in its open position, said trap is supported on the ground by said grid structure and said wheels are raised above the ground, and when said trap is in its closed position, said trap is supported above the ground by said wheels.

17. A trap according to claim 2 including sprinkler mounted thereon for spraying water over said trap.

References Cited

UNITED STATES PATENTS

| | | | |
|---|---|---|---|
| 446,119 | 2/1891 | Smith | 43—78 |
| 1,277,531 | 9/1918 | Behr | 43—78 X |
| 1,584,677 | 5/1926 | Stacy | 43—78 |

WARNER H. CAMP, Primary Examiner